July 4, 1933. M. B. SMALL 1,916,938
INTERNAL COMBUSTION ENGINE SUPPLEMENTARY AIR CONTROL
Filed Aug. 12, 1930
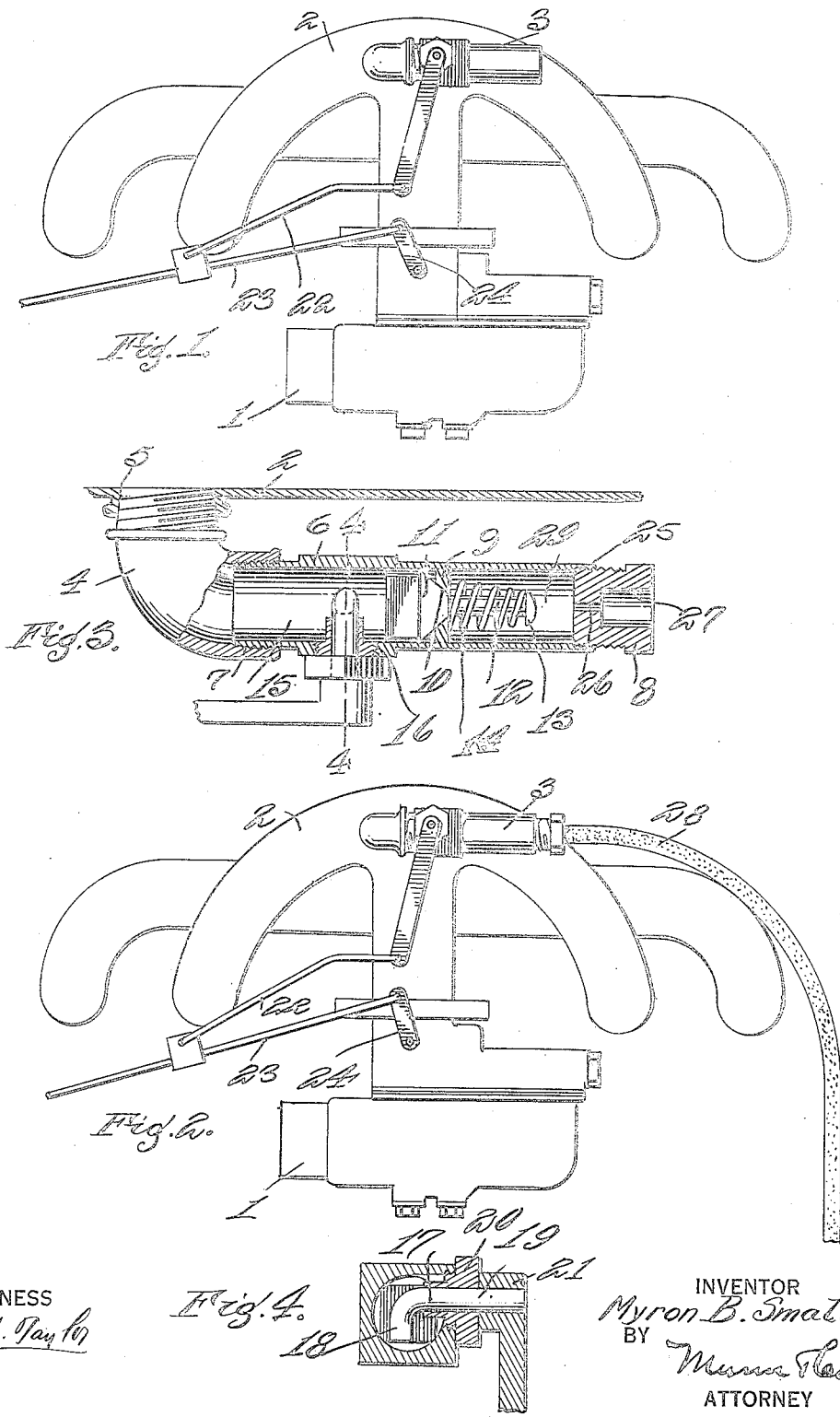
WITNESS
INVENTOR
Myron B. Small.
BY
ATTORNEY Patented July 4, 1933

1,916,938

UNITED STATES PATENT OFFICE

MYRON B. SMALL, OF WOLLASTON, MASSACHUSETTS

INTERNAL COMBUSTION ENGINE SUPPLEMENTARY AIR CONTROL

Application filed August 12, 1930. Serial No. 474,793.

My invention relates to engines more particularly to internal combustion engines utilized in the operation of automobiles and it consists in the combinations, constructions, and arrangements herein shown and described.

The present day automobile equipped with a standard carburetor and traveling at normal road speed requires but slightly opened throttle. Under this condition the air travels through the carburetor at a very high velocity, carrying with it more fuel than is necessary for the best operation of the motor. If the suction through the carburetor could be reduced without reducing the supply of air to be mixed with the fuel the amount of fuel used would be reduced with a consequent increase in the efficiency of operation of the motor. It is therefore a primary purpose of my invention to provide a means that will cut down the amount of suction through the carburetor at intermediate and high speeds of the automobile to decrease the rate of supply of fuel, and at the same time provide sufficient air to form with the fuel a desired lean mixture.

A further object of my invention is to provide a device of the type described that will more thoroughly mix the air and fuel and consequently increase the efficiency of the motor in operation.

A still further object of my invention is to provide a device of the type described that is adapted to perform a carbon cleaning operation of the combustion chambers of the motor, when so desired.

A still further object of my invention is to provide a device of the type described that has few parts, is simple to manufacture and does not get out of order easily.

Other objects and advantages will appear as the specification proceeds and the invention will be more particularly defined in the appended claims.

My device is illustrated in the accompanying drawing forming a part of this application in which:—

Figure 1 is an elevational view of my device,

Figure 2 is an elevational view of my device equipped for cleaning carbon from the motor, Figure 3 is a sectional detail view of a portion of the device, and Figure 4 is a sectional detail view on line 4—4 of Figure 3.

In carrying out my invention I make use of any conventional automobile operated by a combustion engine, having a carburetor and an intake manifold 2 connected to said carburetor. For controlling the suction through the carburetor, and consequently the amount of fuel passing through the same, while at the same time maintaining the proper air supply for mixture with the fuel I mount in the manifold above the carburetor an automatically operated valve 3.

This automatically operated valve comprises an elbow 4 screwed into the wall of the manifold as indicated at 5, a tubular valve casing 6 threadedly engaged with said elbow as shown at 7, and a plug 8 mounted at the opposite end of said casing.

The casing 6 is provided with a partition wall 9, which has a conically formed valve seat 10 therein. Cooperating with this valve seat is a similarly formed valve member 11 having a rod 12 projecting from the nose thereof through the valve seat, and providing at its end a stop or head 13. Positioned between this head 13 and the partition wall 9 is a compression spring 14, which it will observed normally urges the valve member 11 in to valve closed or seated position. The tension of this spring is such that when the pressure in chamber 15 of casing 6, which chamber communicates with the manifold is atmospheric or nearly atmospheric the valve will remain closed. When the vacuum in chamber 15 becomes lower, however, that is, when the pressure decreases due to operation of the engine at higher speeds, the force of this spring is overcome and the valve is opened.

For supplementing the control of this valve by the vacuum in the manifold with a further control from the throttle to assure a proper operation thereof at all throttle positions as well as speed conditions, I mount in the wall of casing 6 as indicated at 16 a lever 17 having a portion 18, which engages with valve member 11 in the manner of a cam and a portion 19 about which portion 18 rotates. This lever 17 is mounted for rotation in a suitable airtight plug 20.

For rotating the lever 17 about the axis of portion 19 to swing portion 18 out of engagement with valve member 11 when the throttle is moved to positions of greater opening to allow operation of said valve member to opened position when the vacuum in chamber 15 increases, and to swing said portion 18 into engagement with said valve member 11 to assure closing of the same when the throttle is just barely opened so that the motor will get a rich mixture of fuel during starting operations and the like said lever is connected for operation to the throttle actuating means. This is accomplished by securing a lever 21 in fixed relationship to lever 17 and connecting the end of said lever by a link 22 to operating rod 23 of throttle control lever 24, the connection being made in such a manner that when the throttle is moved to the positions of greater opening arm 18 of lever 17 swings downwardly out of engagement with valve member 11, and when the throttle is moved to positions of smaller opening arm 18 is moved into engagement with valve member 11 to assure the holding of the same in a closed position for obtaining a rich mixture desirable on these occasions.

During normal operation of the device the end 25 of casing member 6 is opened or exposed to the atmosphere, the plug 8 being removed. For cleaning carbon from the motor when desired the plug 8 is inserted in position as appears in Figure 3. This plug is provided with a small bore 26 and a large bore 27. This bore 27 is adapted for the reception of a flexible tubing 28, which runs to a source of water supply, such as a bottle of water, (not shown).

From the foregoing description the use and operation of my device is easily understood. When the operator moves the throttle to start the automobile or to run the same at slow speed where a rich mixture of fuel with air is necessary for efficient operation the arm 18 remains in engagement with valve member 11 preventing opening of the same even though a large vacuum exists in chamber 15.

When the operator increases the throttle opening to increase the speed of the motor, the arm 18 is removed from engagement with valve member 11 to allow the same to open when the vacuum in chamber 15 becomes sufficient to permit this operation.

The opening of this valve permitting the inrushing air to go into the manifold above the carburetor cuts down the vacuum in said manifold and consequently the suction drawing fuel through the carburetor. This of course cuts down the amount of fuel introduced into the intake manifold while at the same time the air supply is maintained sufficiently large to assure perfect combustion of the fuel.

When the cool air enters the hot manifold through valve seat 10 convection or eddy currents are set up in the gases in said manifold causing a more thorough mixture of said gases, and hence a more thorough combustion of the same in the motor, with consequently increased efficiency in operation of said motor, thereby enabling operation of said motor at these higher speeds at a greater efficiency than before and decreased on a smaller amount of fuel.

When the operator desires to clean the carbon from the motor, plug 8 is inserted in casing 6 and tube 28 inserted in said plug. The other end of tube 28 is then placed in a source of water or other carbon cleaning fluid supply such as a bottle and the motor allowed to operate with throttle opened to a great degree. The water or other carbon removing fluid will then be drawn through bore 26, which is narrow enough to atomize the same and into portion 29 of casing 6 to engage with head 13, where it will be further atomized. It will then pass through valve seat 10, into chamber 15, and thence to the motor to perform its cleaning operation.

It is thus seen that I have provided an attachment for use on automobiles employing combustion engines for their locomotion that automatically regulates the mixture of the fuel and air in accordance with the throttle opening and the speed of the motor to assure the most efficient mixture during all phases of the operation of said motor.

It is also seen that I have provided a means for more thoroughly mixing the fuel and air burnt in combustion engines, thus assuring a more efficient combustion of the fuel with a consequent increase in the horsepower per unit use of fuel derived from said engine.

It is also seen that I have provided a simple means for the introduction of carbon cleaning fluid in atomized form into a combustion engine for cleaning said engine of carbon.

I claim:—

1. In a combined air and liquid feeding valve for internal combustion motors comprising an elongated shell having means at one end for connection to an intake manifold, a valve seat formed intermediate the length of said shell, a valve for said valve seat and normally maintained in seated engagement with said seat, a plug for the other end of said shell having a small bore, a head within said shell and positioned in advance of and in alinement with said bore and means for introducing a liquid into said bore to engage said head.

2. In a combined air and liquid feeding valve for internal combustion motors comprising an elongated shell having means at one end for connection to an intake manifold, a valve seat formed intermediate the length of said shell, a valve for said valve seat including a stem having a headed member, a helical spring interposed between said valve seat and said headed member, a plug for the other end of said shell having a small bore, said bore being in alinement with said headed member and said plug further having means for introducing a liquid into said bore to engage said headed member.

3. In a combined air and liquid feeding valve for internal combustion motors comprising an elongated shell having means at one end for connection to an intake manifold, a valve seat formed intermediate the length of said shell, a valve for said valve seat including a stem having a headed member, a helical spring interposed between said valve seat and said headed member, a plug for the other end of said shell having a small bore, said bore being in alinement with said headed member and said plug further having means for introducing a liquid into said bore to engage said headed member, and means for limiting the opening movement of said valve with the speed of the internal combustion motor.

4. An air valve for internal combustion motors, comprising an elongated shell having means at one end for connection to an intake manifold, a valve seat formed intermediate the length of said shell, a valve for said valve seat including a stem having a headed member, a helical spring interposed between said valve seat and said headed member, a plug for the other end of said shell having a small bore, said bore being in alignment with said headed member, and means for limiting the opening movement of said valve in accordance with the position of the speed control means of the internal combustion motor.

5. In combination with the combustion engine of an automobile having a throttle and suction operated fuel intake means, a conical valve positioned between said fuel intake means and said engine for variably decreasing the suction through said fuel intake and for introducing air into said engine, and means operatively connected to said throttle and including an abutment on said valve for camming said valve against the action of suction from said intake means.

6. In combination with the combustion engine of an automobile having a throttle and suction operated fuel intake means, a tapered valve operable by suction from said intake means, and positioned between said fuel intake means and said engine for variably decreasing the suction through said fuel intake and for introducing air into said engine, and means operatively connected to said throttle and including an abutment on said valve for camming said valve against the action of suction.

MYRON B. SMALL.